US008840858B2

(12) United States Patent
Bernstein et al.

(10) Patent No.: US 8,840,858 B2
(45) Date of Patent: Sep. 23, 2014

(54) APPARATUS FOR MIXING VAPORIZED PRECURSOR AND GAS AND METHOD THEREFOR

(75) Inventors: Lewis A Bernstein, Wilmington, NC (US); Dana Craig Bookbinder, Corning, NY (US); Jason A Dillard, Wilmington, NC (US); Jennifer L Porter, Wilmington, NC (US); Balram Suman, Katy, TX (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 747 days.

(21) Appl. No.: 13/176,804

(22) Filed: Jul. 6, 2011

(65) Prior Publication Data
US 2013/0011319 A1    Jan. 10, 2013

(51) Int. Cl.
*C01B 33/12* (2006.01)
*C03B 37/014* (2006.01)

(52) U.S. Cl.
CPC ....... *C03B 37/01413* (2013.01); *C03B 2207/42* (2013.01); *C03B 2207/46* (2013.01)
USPC .............. 423/335; 65/391; 65/412; 65/398; 65/531; 65/421; 65/537; 65/397; 65/414; 65/417

(58) Field of Classification Search
CPC ................ C03B 37/01413; C03B 2207/46; C03B 2207/42; C03B 33/12; C03B 19/14; C03B 19/066; C03B 19/063; C03B 19/00; B01J 19/00
See application file for complete search history.

(56) References Cited

U.S. PATENT DOCUMENTS

| 5,043,002 | A | | 8/1991 | Dobbins et al. | |
|---|---|---|---|---|---|
| 5,558,687 | A | | 9/1996 | Cain | |
| 5,632,797 | A | | 5/1997 | Williams | |
| 5,703,191 | A | * | 12/1997 | Henderson et al. | 528/31 |
| 5,879,649 | A | | 3/1999 | Henderson et al. | |
| 7,930,904 | B2 | | 4/2011 | Bookbinder et al. | |
| 2002/0189296 | A1 | * | 12/2002 | Cain et al. | 65/391 |
| 2005/0069638 | A1 | | 3/2005 | Rajala et al. | |
| 2005/0109066 | A1 | * | 5/2005 | Dabby et al. | 65/531 |
| 2006/0001952 | A1 | * | 1/2006 | Janka et al. | 359/342 |

FOREIGN PATENT DOCUMENTS

| WO | 9105743 | A1 | 5/1991 |
|---|---|---|---|
| WO | 9722553 | A1 | 6/1997 |
| WO | 9906331 | A1 | 2/1999 |

* cited by examiner

Primary Examiner — Melvin C Mayes
Assistant Examiner — Smita Patel
(74) Attorney, Agent, or Firm — Robert L. Carlson

(57) ABSTRACT

An apparatus for mixing a vaporized precursor with a gas for producing silica particles is provided. The apparatus includes a mixer housing, a precursor delivery chamber having an output in communication with the mixer housing for delivering a vaporized precursor in the mixer housing, and an oxidizing gas delivery chamber having an output in communication with the mixer housing for delivering an oxidizing gas to be mixed with the vaporized precursor. The apparatus further includes a flashback member disposed within the mixer housing and between the output of the precursor delivery chamber and the output of the oxidizing gas delivery chamber. The flashback member is located at a minimum distance from the output of the oxidizing gas delivery chamber defined by $L_{minimum}$ (cm)=0.453 U (Re)$^{-0.5567}$, wherein U is the flow rate in cm/sec of precursor and Re is the flow Reynolds number. The flashback member may include a tapered surface on at least one side to reduce recirculation of vaporized gas.

7 Claims, 3 Drawing Sheets

APPARATUS FOR MIXING VAPORIZED PRECURSOR AND GAS AND METHOD THEREFOR

BACKGROUND

The present invention generally relates to a precursor and gas mixing unit, and more particularly relates to an apparatus for mixing vaporized precursor with a gas for producing pyrogenically generated silica particles such as those used in making fused silica and optical fiber preforms.

Conventional optical fiber preforms typically include silica particles. Halide free cyclo-siloxanes, such as octamethylcyclotetracyloxane (OMCTS), are typically used as a precursor for producing pyrogenically generated silica particles which are currently used in making fused silica and the optical fiber preforms. The precursor typically is a liquid that is vaporized in a vaporizer and flows in a stream through a delivery tube to combine downstream with oxygen in a mixing unit. The mixture of precursor and oxygen is then fed to a burner where the mixture undergoes oxidation reaction at high temperature in the presence of a flame to form silica particles. At the junction where the oxygen and the precursor are mixed, the precursor (which includes the presence of impurities such as high molecular weight siloxanes, non-volatile residue, amines, silanes, acids (e.g., HCl), and bases (NaOH, KOH)) can polymerize with oxygen resulting in the formation of a gel. Gelling in the delivery system generally results in increased back pressure and requires periodic cleaning of the equipment to remove the gel layer. This results in equipment down time and makes the manufacturing process inefficient. It is therefore desirable to provide for a precursor and gas delivery system that reduces or eliminates the undesirable gel formation.

SUMMARY

According to one embodiment, a method of forming silica soot is provided. The method includes the steps of providing an apparatus comprising a mixer housing, a precursor delivery chamber having an output in communication with the mixer housing, an oxidizing gas delivery chamber having an output in communication with the mixer housing, and a flashback member disposed within the mixer housing and between the output of the precursor delivery chamber and the output of the oxidizing gas delivery chamber, wherein the flashback member is located at a minimum distance from the output of the oxidizing gas delivery chamber defined by $L_{minimum}$ (cm)=$0.453$ $U$ $(Re)^{-0.5567}$, wherein U is the flow rate in cm/sec of precursor and Re is the flow Reynolds number. The method further includes the steps of delivering via the precursor delivery chamber a vaporized precursor in the mixer housing, delivering via the oxidizing gas delivery chamber an oxidizing gas to be mixed with the vaporized precursor such that the vaporized precursor and the oxidizing gas are mixed in the mixer housing. The method further includes outputting the mixed vaporized precursor and oxidizing gas as a stream to a burner to form silica soot.

According to another embodiment, a method of forming silica soot is provided. The method includes the steps of providing an apparatus comprising a mixer housing, a precursor delivery chamber having an output in communication with the mixer housing, an oxidizing gas delivery chamber having an output in communication with the mixer housing, and a flashback member disposed within the mixer housing and between the output of the precursor delivery chamber and the output of the oxidizing gas delivery chamber, wherein the flashback member comprises a tapered surface on at least one side to reduce recirculation of vaporized gas. The method further includes the steps of delivering via the precursor delivery chamber a vaporized precursor in the mixer housing and delivering via the oxidizing gas delivery chamber an oxidizing gas to be mixed with the vaporized precursor such that the vaporized precursor and the oxidizing gas are mixed in the mixer housing. The method further includes outputting the mixed vaporized precursor and oxidizing gas as a stream to a burner to form silica soot.

According to yet another embodiment, an apparatus for mixing a vaporized precursor with a gas for producing silica particles is provided. The apparatus includes a mixer housing, a precursor delivery chamber having an outlet in communication with the mixer housing for delivering a vaporized precursor in the mixer housing, and an oxidizing gas delivery chamber having an output in communication with the mixer housing for delivering an oxidizing gas to be mixed with the vaporized precursor. The apparatus further includes a flashback member disposed within the mixer housing and between the output of the precursor delivery chamber and the output of the oxidizing gas delivery chamber, wherein the flashback member is located at a minimum distance from the output of the oxidizing gas delivery chamber defined by $L_{minimum}$ (cm)=$0.453$ $U$ $(Re)^{-0.5567}$, wherein U is the flow rate in cm/sec of precursor and Re is the flow Reynolds number.

According to a further embodiment, an apparatus for mixing a vaporized precursor with a gas for producing silica particles is provided. The apparatus includes a mixer housing, a precursor delivery chamber having an output in communication with the mixer housing for delivering a vaporized precursor, and an oxidizing gas delivery chamber in communication with the mixer housing for delivering an oxidizing gas to be mixed with the vaporized precursor. The apparatus further includes a flashback member disposed within the mixer housing and between the output of the precursor delivery chamber and the output of the oxidizing gas delivery chamber, wherein the flashback member comprises a tapered surface on at least one side to reduce recirculation of vaporized gas.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
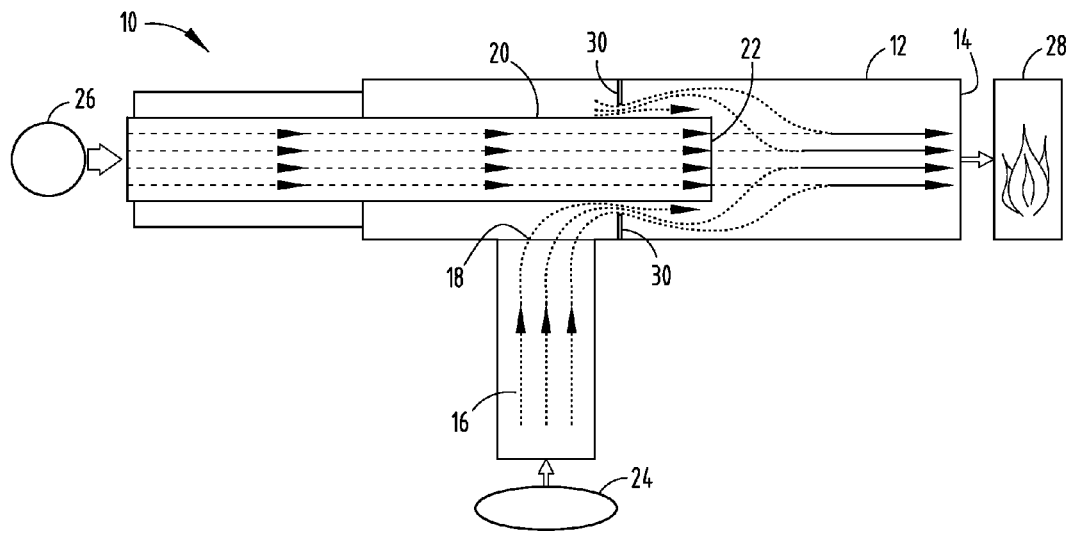
FIG. 1 is a schematic representation of a mixing apparatus for mixing a precursor with a gas, according to one embodiment.

Reference will now be made in detail to the present preferred embodiments, examples of which are illustrated in the accompanying drawings. Whenever possible, the same reference numerals will be used throughout the drawings to refer to the same or like parts.

Various embodiments of a mixing unit or apparatus for mixing a vaporized precursor, such as halide free cyclo-siloxanes, e.g., octamethylcyclotetracyloxane (OMCTS), with a gas are disclosed herein for producing silica particles. The apparatus includes a mixer housing, a precursor delivery chamber having an output in communication with the mixer housing for delivering a vaporized precursor in the mixer housing, and an oxidizing gas delivery chamber having an output in communication with the mixer housing for delivering an oxidizing gas, such as oxygen, to be mixed with the vaporized precursor. The apparatus has a flashback member disposed within the mixer housing between the output of the precursor delivery chamber and the output of the oxidizing gas tube. According to one embodiment, the flashback member is located at a minimum distance from the output of the oxidizing gas delivery chamber defined by $L_{minimum}$ (cm)=0.453 U (Re)$^{-0.5567}$, wherein U is the flow rate in centimeters/seconds of precursor and Re is the flow Reynolds number. According to another embodiment, the flashback member is disposed within the mixer housing and between the output of the precursor delivery chamber and the output of the oxidizing gas delivery chamber wherein the flashback member comprises a tapered surface on at least one side to reduce recirculation of vaporized gas.

The apparatus advantageously mixes gas, such as oxygen, and precursor, such as cyclo-siloxane (e.g., OMCTS), in a manner that reduces or eliminates undesirable gelling within the delivery system. Reduction or elimination of the gelling may be achieved by mixing the OMCTS vapor stream and oxygen stream in a manner such that there is a minimum extension length beyond where the OMCTS is introduced before it comes into contact with the oxygen stream. In some embodiments, the precursor and oxygen are mixed prior to exiting the burner face. In some embodiments, the minimum length that the precursor and oxygen are mixed prior to exiting the burner face is greater than or equal to 1 cm. In other embodiments, the minimum length that the precursor and oxygen are mixed prior to exiting the burner face is greater than or equal to 10 cm. In other embodiments, the minimum length that the precursor and oxygen are mixed prior to exiting the burner face is greater than or equal to 100 cm. In other embodiments, the minimum length that the precursor and oxygen are mixed prior to exiting the burner face is greater than or equal to 1 meter. The flashback member in the form of an orifice or ring is typically used as a flame arrestor to stop flame flashback into the delivery system. For insufficient extension length, a strong recirculation zone may develop that results in significant back diffusion of oxygen into the OMCTS vapor stream. The back diffusion of oxygen and increased residence time due to the recirculation zone may result in sufficient oxygen concentration and time for the polymerization reaction to take place, thereby causing significant gelling close to the location where the two streams come into contact. By positioning the flashback orifice at a minimum extension distance beyond where the OMCTS is introduced before it comes into contact with the oxygen stream, the gelling effect can be reduced or eliminated. The minimum extension length may depend upon the relationship with the OMCTS flow rate and the dimensions of the opening through which the OMCTS vapors are introduced as disclosed herein. Additionally, the flashback orifice or ring may be configured with a tapered flashback venturi that further prevents the trapped recirculation vortex which helps in the elimination of trapping of the recirculation zone in the flow, thereby helping with reducing the polymerization rate. If the recirculation zone can be avoided, there is not sufficient residence time for the polymerization reaction to take place.

Referring to FIG. 1, a mixing apparatus 10 for mixing a vaporized precursor with an oxidizing gas for producing silica particles is generally illustrated, according to one embodiment. The apparatus 10 includes a mixer housing 12 generally having a first inlet for receiving a flow stream of vaporized precursor from a liquid vaporized precursor supply 24 and a second inlet for receiving a flow stream of an oxidizing gas from an oxidizing gas supply 26. The mixer housing 12 further includes an internal volume for mixing the vaporized precursor and oxidizing gas and an output or outlet 14 for outputting a flow stream of the mixture of precursor and gas to a burner 28. The burner 28 generally includes a flame for pyrogenically generating silica particles from the mixture of precursor and gas. The mixer housing 12 may be a cylindrical housing, according to one embodiment.

The mixing apparatus 10 includes a precursor delivery chamber 16 having an outlet or output 18 in communication with the mixer housing 12, particularly at the first inlet, for delivering the vaporized precursor provided from the precursor supply 24 into the mixer housing 12. It should be appreciated that vaporizers for providing vaporized precursor from a liquid precursor are known in the art. The vaporized precursor may include halide free cyclo-siloxane. One example of a halide free cyclo-siloxane is octamethylcyclotetracyloxane (OMCTS). The precursor delivery chamber 16 may be configured as a cylindrical tube, according to one embodiment. The vaporized precursor is delivered as a flow stream through the precursor delivery chamber 16 through an outlet or output 18 having a known diameter and at a desired precursor flow rate.

The mixing apparatus 10 also includes an oxidizing gas delivery chamber 20 having an outlet or output 22 in communication with the mixer housing 12, particularly at the second inlet, for delivering the oxidizing gas to be mixed with the vaporized precursor. The oxidizing gas delivery chamber 20 receives oxidizing gas from the oxidizing gas supply 26 and delivers a stream of oxidizing gas at an output 22 into the mixer housing 12 at a desired flow rate. The oxidizing gas delivery chamber 20 may include a cylindrical tube, according to one embodiment. The oxidizing gas delivery tube 20 may have an inner diameter (ID) $L_6$ of 0.4 inches (1 cm) and an outer diameter (OD) of 0.5 inches (1.3 cm), according to one embodiment. The oxidizing gas may include oxygen, according to one embodiment. According to other embodiments, the oxidizing gas may include one or more of nitrogen oxide, nitrous oxide and air comprising oxygen.

The mixing apparatus 10 further includes a flashback member 30 disposed within the mixer housing 12 and between the output 18 of the precursor delivery chamber 16 and the output 22 of the oxidizing gas delivery chamber 20. The flashback member 30 is configured as a flashback orifice in the shape of a ring that consumes a portion of the volume between the inner wall of the mixer housing 12 and the outer wall of the oxidizing gas delivery chamber 20 so as to provide a passageway therebetween for the flow of precursor from precursor delivery chamber 16 into the mixer housing 12. The flow stream of vaporized precursor flows through the gap between the outer surface of the oxidizing gas delivery chamber 20 and the flashback member 30 and mixes with the oxidizing gas. The flashback orifice 30 is located at a minimum distance from the output of the oxidizing gas delivery chamber 20 defined by $L_{minimum}$ (cm)=0.453 U (Re)$^{-0.5567}$, wherein U is a flow rate in cm/sec of precursor and Re is the flow Reynolds number. The flashback orifice 30 advantageously stops flashback into the delivery system, and due to the minimum length $L_{minimum}$ prevents significant back diffusion of oxygen into the OMCTS vapor stream so as to prevent significant gelling from taking place at the location where the flow streams of precursor and gas come into contact. In this embodiment, the flashback ring 30 has angle $\theta_1$ of 90° such that it extends perpendicular to the longitudinal axis or flow axis of the mixer housing 12.

The flashback ring 30 is shown at a distance $L_3$ from the outlet 22 of the oxidizing gas chamber 20. The minimum distance $L_{minimum}$ establishes the minimum distance of length $L_3$. The distance between the inside surface of mixer housing 12 and the outer surface of the oxidizing gas delivery chamber 20 is shown by $L_2$. The distance between the flashback ring 30 and the outer surface of the oxidizing gas delivery chamber 20 has a length $L_1$. Length $L_1$ defines the gap size through which the vaporized precursor flow stream is delivered to the mixer housing 12. The ratio of length $L_2$ to length $L_1$ is preferably equal to or greater than 3, and less than 20, and more preferably less than 13. The length $L_3$ is measured from the point on the flashback ring 30 that provides the narrowest gap or smallest length $L_1$ or, if the flashback ring 30 has a width of a constant height, then the length $L_3$ is measured from the point on the flashback ring 30 closest to the output 22 of the oxidizing gas delivery chamber 20.

The flow Reynolds number is defined by $$Re = \frac{U \rho D}{\mu},$$

wherein $\rho$ is density of the gas, D is distance between the flashback member 30 and the oxidizing gas delivery chamber 20 which is shown as length $L_1$ and $\mu$ is gas viscosity of the precursor. The distance $L_{minimum}$ is at least 2 centimeters, according to one embodiment. According to one example, in which the OMCTS precursor flow rate is 460 g/min, the oxygen stream flow rate is 160 slpm, the outer diameter of the oxygen stream delivery tube 20 is 0.5 inches (1.3 cm), and inner diameter of 0.4 inches (1 cm), the diameter of the OMCTS stream delivery tube 18 is 1.0 inch (2.5 cm), the orifice diameter of the flashback ring 30 is 0.62 inches (1.6 cm) and a temperature is 205° C., the extension length $L_3$ has a length of about 2.0 inches (5.1 cm) such that the recirculation zone is avoided and oxygen back-diffusion is limited. As a comparison, a smaller extension length $L_3$ of approximately 0.25 inches (0.6 cm) caused depreciable oxygen back mixing into the OMCTS vapor stream. By maintaining a minimum extension length $L_3$ as defined herein, the recirculation zone is dramatically reduced and the oxygen back-diffusion is eliminated, resulting in the polymerization action being suppressed and gelling issues being substantially eliminated. According to one embodiment, the Reynolds number Re is greater than 1,000 for the oxygen gas flow across the diameter $L_6$ of the oxidizing gas delivery chamber 20 to avoid recirculation back into the oxygen tube 20.

Referring to Table 1 below, three examples of mixing apparatus 10 are provided with various lengths and a 90° angle dimension. In these three examples, the above defined flow rate and diameter information was employed which included the OMCTS precursor flow rate of 460 g/min, the oxygen flow stream rate of 160 slpm, the diameter of the oxygen stream delivery tube 20 is 0.5 inches (1.3 cm), the diameter of the OMCTS stream delivery 18 is 1.0 inch (2.5 cm), the orifice diameter of the flashback ring 30 is 0.62 inches (1.6 cm) and a temperature is 205° C. Examples 1-3 illustrate length dimensions $L_1$, $L_2$ and $L_3$, and the ratio of lengths $L_2$ to $L_1$ and all at an angle of $\theta_1$ of 90°. In all of examples 1-3 there is no recirculation and no gelling issue.

TABLE 1

| Parameter | Example 1 | Example 2 | Example 3 |
| --- | --- | --- | --- |
| $L_1$, (mm) | 1.59 | 2.12 | 1.00 |
| $L_2$, (mm) | 6.35 | 6.35 | 6.35 |
| $L_2/L_1$ | 4.0 | 3.0 | 6.4 |
| $L_3$, (mm) | 52.0 | 39.0 | 85.0 |
| $\theta_1$, (degree) | 90 | 90 | 90 |

Figure 2:
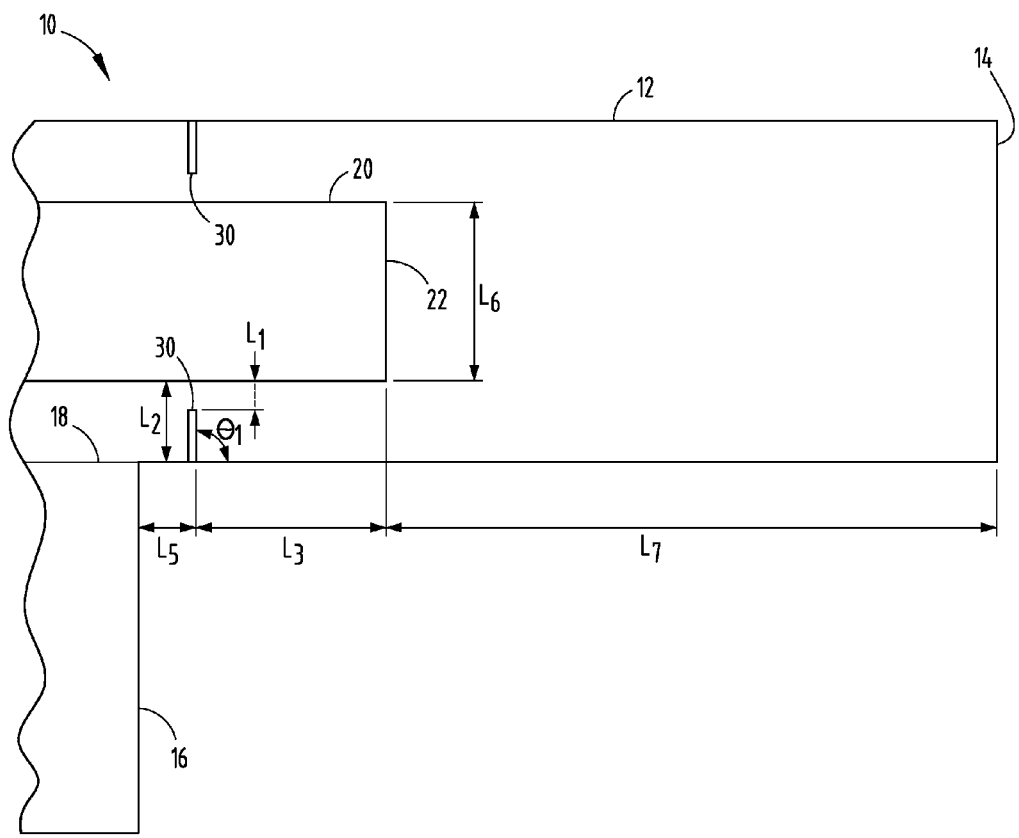
FIG. 2 is an enlarged partial view of the mixing apparatus shown in FIG. 1.
Figure 3:
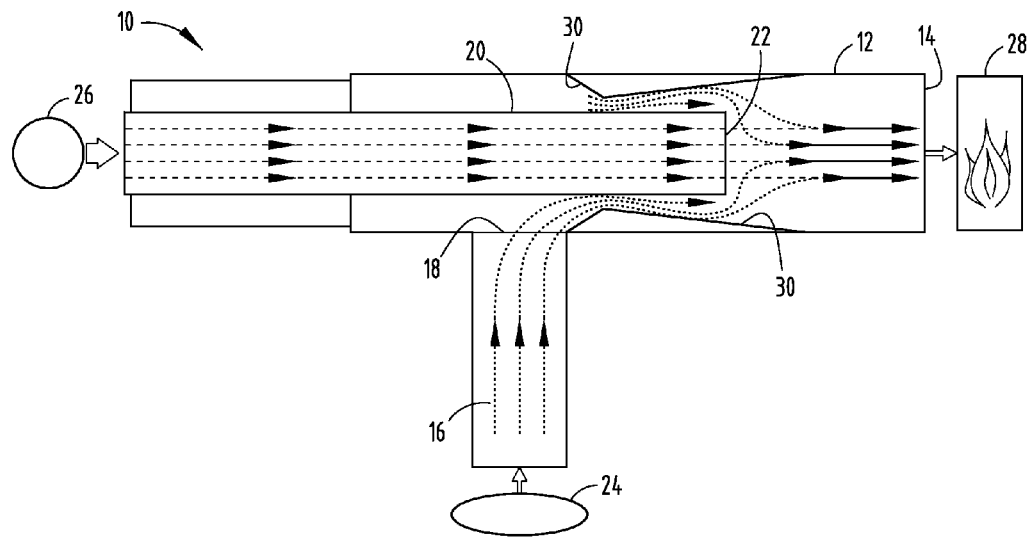
FIG. 3 is a schematic representation of a mixing apparatus for mixing a precursor with a gas and employing an angled flashback orifice, according to another embodiment.
Figure 4:
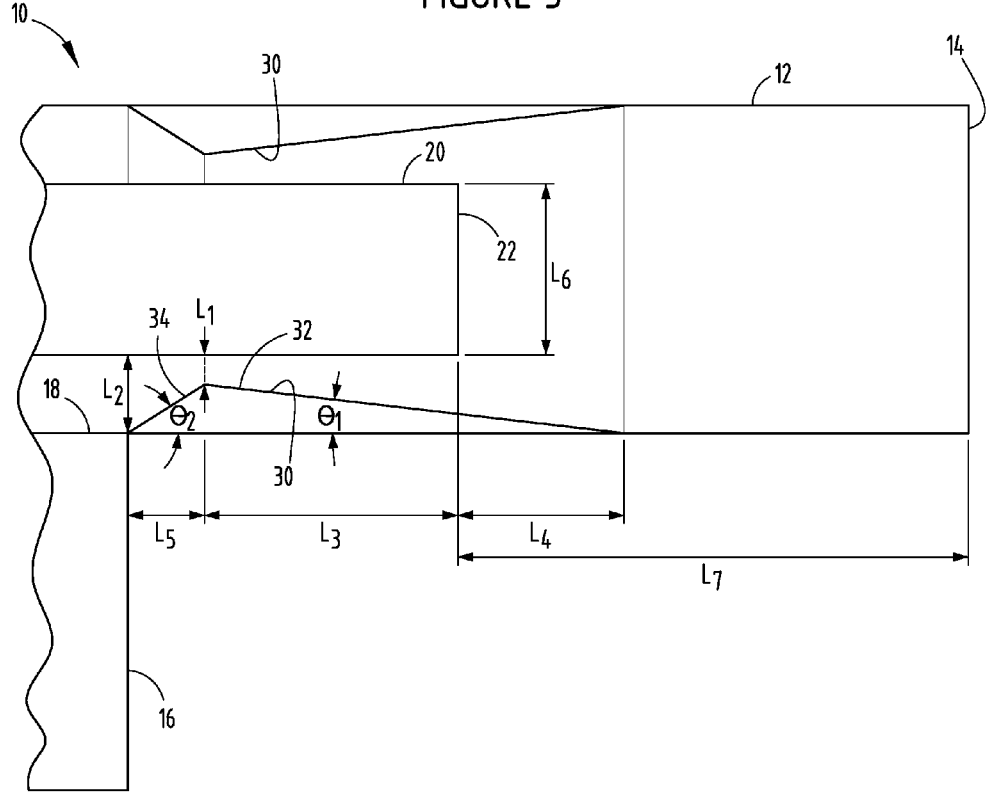
FIG. 4 is an enlarged partial view of the mixing apparatus shown in FIG. 3.

Referring to FIG. 2, a mixing apparatus 10 for mixing a vaporized precursor with a gas for producing silica particles is illustrated employing an angled flashback venturi, according to another embodiment. In this embodiment, the mixing apparatus 10 likewise includes a mixture housing 12, a precursor delivery chamber 16 for delivering vaporized precursor from a precursor supply 24, and the oxidizing gas delivery chamber 20 for delivering a flow of oxidizing gas from a gas supply 26. The flow streams of vaporized precursor and oxidizing gas are mixed together to form a stream which is fed to a burner 28. In this embodiment, a flashback member 30 disposed within the mixer housing 12 and between the output 18 of the precursor delivery chamber 16 and the output 22 of the oxidizing gas delivery chamber 20, wherein the flashback member 30 comprises a tapered surface on at least one side to reduce or prevent recirculation of vaporized gas. The flashback member 30 is formed as a tapered venturi having a converging wall 34 on the upstream side of the precursor flow and a diverging wall 32 on the downstream side of the precursor flow. The converging wall 34 is formed at an angle $\theta_2$ relative to the horizontal wall of the housing member 12 as shown in FIG. 4. The diverging surface 32 is formed at an angle $\theta_1$ relative to the horizontal housing wall shown in FIG. 4. The diverging wall 32 has an angle $\theta_1$ in the range of 6° to 50°, according to one embodiment. According to another embodiment, the diverging wall 32 has an angle $\theta_1$ in the range of 10° to 35°. The use of a flashback orifice 30 having a converging-diverging venturi shape helps to eliminate trapping of the recirculation zone in the flow, thereby reducing the polymerization rate.

The flashback orifice 30 has a minimum gap labeled distance $L_3$ through which vaporized precursor flows in a stream between the orifice ring 30 and the outer wall of the oxidizing gas delivery chamber 20. The distance between the inside surface of the mixer housing 12 and the outer surface of the oxidizing gas delivery chamber 12 is also shown by length $L_2$. The ratio of length $L_2$ to length $L_1$ is preferably greater than or equal to 3, according to one embodiment. Additionally, the ratio of length $L_2$ to length $L_3$ is preferably less than 20, and more preferably less than 13. The length $L_3$ is measured from the narrowest point on the flashback orifice 30 that provides the narrowest gap or smallest length $L_1$. The converging wall 34 converges over a horizontal length $L_5$, and the diverging wall 32 diverges over a horizontal length $L_3$. In this embodiment, the length of the diverging wall 32 extends by a length $L_4$ beyond the output 22 of the oxidizing gas delivery chamber 20. In this example, the output 22 of the oxidizing gas delivery chamber 20 is at a distance from the burner 28 labeled $L_7$.

The flashback orifice 30 establishes a cross-sectional first area determined by gap $L_1$. Distance $L_2$ establishes a second cross-sectional area between the inner wall of the housing 12 and the outer wall of the oxidizing gas delivery chamber 20. The ratio of the second area to the first area is within the range of 4 to 10, according to one embodiment, and more preferably in the range of 4 to 6.

Referring to Table 2 below, examples of a mixing apparatus 10 are illustrated having various length dimensions $L_1$, $L_2$ and $L_3$, and angles $\theta_1$, all of which prevent, reduce or recirculation and hence reduce or prevent gel formation. Examples 4-14 include flow rate and diameter dimensions as described above in connection with the earlier examples in which the OMCTS precursor has a flow rate of 460 g/min, the oxygen flow stream rate of 160 slpm, the diameter of the oxygen stream delivery tube 20 is 0.5 inches (1.3 cm), the diameter of the OMCTS stream delivery tube 18 is 1.0 inch (2.5 cm), the orifice diameter of the flashback ring 30 is 0.62 inches (1.6 cm) and a temperature is 205° C.

128 of the burner 28 to oxidize it. Fuel 130, such as methane (CH4), and combustion supporting gas 26, such as oxygen, are provided to the burner 28 and ignited to form the flame 128. Mass flow controllers, labeled V, meter the appropriate amounts of suitable dopant compound 132, silica glass precursor 24, fuel 130 and combustion supporting gas 26, all preferably in gaseous form to the burner 28. The glass former compounds 24 and 132 are oxidized in the flame 128 to form the generally cylindrically-shaped soot region 134. In particular, a dopant compound 132 may be included if desired. For example, a germanium compound may included as an index of refraction increasing dopant (e.g., in the core of the fiber), or a fluorine containing compound may be included to lower the index of refraction (e.g., in the cladding and/or void containing region of the fiber).

A method of forming silica soot is provided, according to one embodiment. The method includes the steps of providing an apparatus comprising a mixer housing, a precursor delivery chamber having an output in communication with the mixer housing, an oxidizing gas delivery chamber having an output in communication with the mixer housing, and a flashback member disposed within the mixer housing and between the output of the precursor delivery chamber and the output of the oxidizing gas delivery chamber, wherein the flashback

TABLE 2

| Parameter | Example 4 | Example 5 | Example 6 | Example 7 | Example 8 | Example 9 |
|---|---|---|---|---|---|---|
| $L_1$, (mm) | 1.59 | 2.12 | 1.00 | 0.75 | 0.50 | 1.59 |
| $L_2$, (mm) | 6.35 | 6.35 | 6.35 | 6.35 | 6.35 | 6.35 |
| $L_2/L_1$ | 4.0 | 3.0 | 6.4 | 8.5 | 12.7 | 4.0 |
| $L_3$, (mm) | 6.35 | 6.35 | 6.35 | 6.35 | 6.35 | 23.00 |
| $L_4$, (mm) | 0.00 | 0.00 | 0.00 | 0.00 | 0.00 | 0.00 |
| $\theta_1$, (degree) | 37 | 34 | 40 | 41 | 43 | 11 |

| Parameter | Example 10 | Example 11 | Example 12 | Example 13 | Example 14 |
|---|---|---|---|---|---|
| $L_1$, (mm) | 1.59 | 1.59 | 1.59 | 1.59 | 0.32 |
| $L_2$, (mm) | 6.35 | 6.35 | 6.35 | 8.50 | 6.35 |
| $L_2/L_1$ | 4.0 | 4.0 | 4.0 | 5.3 | 19.8 |
| $L_3$, (mm) | 25.00 | 12.00 | 4.00 | 25.00 | 6.00 |
| $L_4$, (mm) | 20.00 | 8.00 | 0.00 | 0.00 | 0.00 |
| $\theta_1$, (degree) | 6 | 13 | 50 | 15 | 45 |

All of the examples 1-14 illustrate that recirculation or back mixing can be avoided or substantially reduced, thereby reducing or eliminating the gel formation. Accordingly, the apparatus advantageously employs a minimum distance from the flashback member to the oxidizing gas delivery chamber sufficient to minimize recirculation. Additionally, the tapered surface of the flashback member also reduces recirculation of the vaporized gas, resulting in a substantially gel-free delivery system. The mixing apparatus allows for the efficient mixing of the vaporized precursor and oxidizing gas for producing pyrogenically generated silica particles. The mixing apparatus may advantageously be employed for making fused silica, according to one embodiment. According to another embodiment, the silica particles may be employed to make optical fiber preforms.

Figure 5:
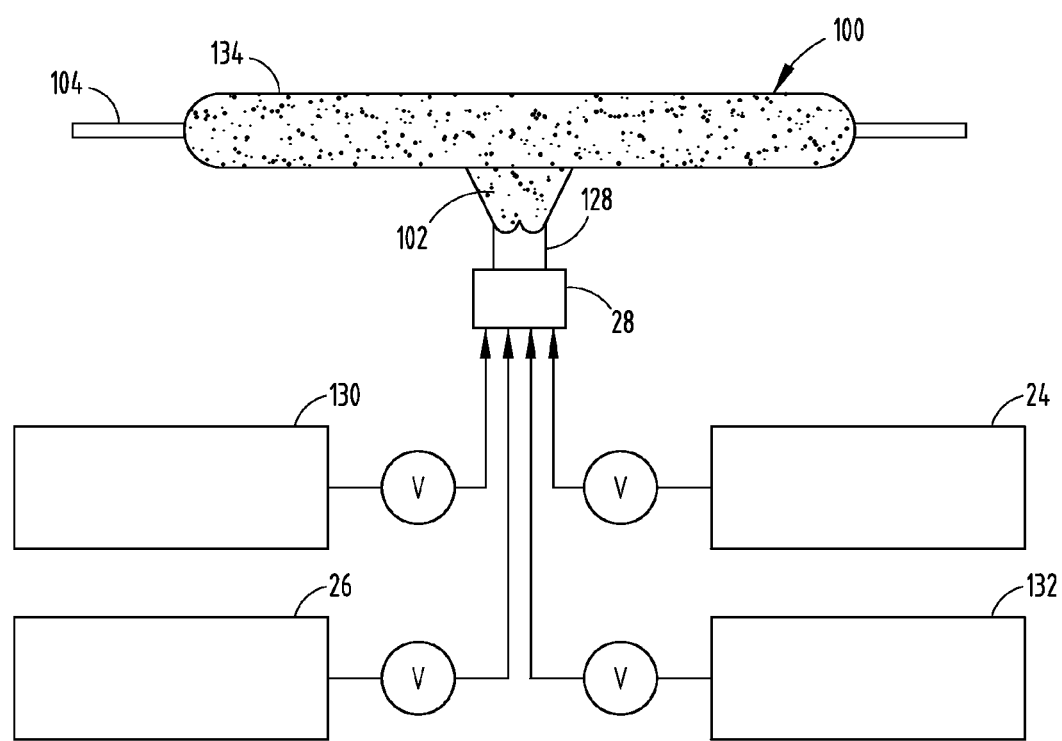
FIG. 5 illustrates an outside vapor deposition (OVD) for forming a soot preform.

FIG. 5 illustrates a method of manufacturing a soot optical fiber preform 100 which can be used in conjunction with the apparatus for mixing the vaporized precursor with a gas. In the embodiment shown, soot preform 100 is formed by depositing silica-containing soot 102 onto an outside of a rotating and translating mandrel or bait rod 104. This process is known as the OVD or outside vapor deposition process. Mandrel 104 may be tapered. The soot 102 is formed by providing glass precursor 24 in a gaseous form to the flame member is located at a minimum distance from the output of the oxidizing gas delivery chamber defined by $L_{minimum}$ (cm)=$0.453$ U $(Re)^{-0.5567}$, wherein U is the flow rate in cm/sec of precursor and Re is the flow Reynolds number. The method further includes the steps of delivering via the precursor delivery chamber a vaporized precursor in the mixer housing, and delivering via the oxidizing gas delivery chamber an oxidizing gas to be mixed with the vaporized precursor such that the vaporized precursor and the oxidizing gas are mixed in the mixer housing. The method further includes outputting the mixed vaporized precursor and oxidizing gas as a stream to a burner to form silica soot. The method further includes depositing the silica soot onto a substrate to form an optical fiber preform.

According to various aspects of the method, the flow Reynolds number is defined by $$Re = \frac{U \rho D}{\mu},$$

wherein $\rho$ is density of the gas, D is distance between the flashback member and the oxidizing gas delivery chamber and $\mu$ is gas viscosity of the precursor. The minimum distance $L_{minimum}$ may be at least 2 centimeters. The flashback member comprises a tapered surface on at least one side to reduce recirculation of gas and further on a diverging side of the flow of precursor. The flashback member has a tapered surface at an angle in the range of 6° to 50°. A ratio of a first distance between the precursor delivery chamber and the oxidizing gas chamber to a second distance between the flashback member and the oxidizing gas chamber is greater than 3. The ratio of the first distance to the second distance is less than 20. The flashback member has a first tapered surface on an inlet side and a second tapered surface on an outlet side. The precursor comprises a halide-free cyclo-siloxane. The halide-free cyclo-siloxane comprises octamethylcyclotetrayloxane, and wherein the oxidizing gas comprises oxygen.

A method of forming silica soot is also provided including the step of providing an apparatus comprising a mixer housing, a precursor delivery chamber having an output in communication with the mixer housing, an oxidizing gas delivery chamber having an output in communication with the mixer housing, and a flashback member disposed within the mixer housing and between the output of the precursor delivery chamber and the output of the oxidizing gas delivery chamber, wherein the flashback member comprises a tapered surface on at least one side to reduce recirculation of vaporized gas. The method also includes delivering via the precursor delivery chamber a vaporized precursor in the mixer housing, delivering via the oxidizing gas delivery chamber an oxidizing gas to be mixed with the vaporized precursor such that the vaporized precursor and the oxidizing gas are mixed in the mixer housing, and outputting the mixed vaporized precursor and oxidizing gas as a stream to a burner to form silica soot. The method further includes the step of depositing the silica soot onto a substrate to form an optical fiber preform.

According to various aspects of the method, the tapered surface is on the diverging side of the flashback member, and the diverging side has an angle of in the range of 6° to 50°. A ratio of a first distance between the precursor delivery chamber and the oxidizing gas chamber to a second distance between the flashback member and the oxidizing gas chamber is greater than 3. The ratio of the first distance to the second distance is less than 20 and the ratio of the first distance and second distance is less than 13. The flashback member has a first tapered surface on an inlet side and a second tapered surface on an outlet side. The flashback member is located at a minimum distance from the output of the oxidizing gas tube defined by $L_{minimum}$ (cm)=0.453 U (Re)$^{-0.5567}$, wherein U is the flow rate in cm/sec of precursor and Re is the flow Reynolds number. The flow Reynolds number is defined by $$Re = \frac{U\rho D}{\mu},$$

wherein ρ is density of the gas, D is distance between the ring and the oxidizing gas delivery chamber and μ is gas viscosity of the precursor. The minimum distance $L_{minimum}$ is at least 2 centimeters.

It will be apparent to those skilled in the art that various modifications and variations can be made without departing from the spirit or scope of the claims.

What is claimed is:

1. A method of forming silica soot, said method comprising the steps of:
   providing an apparatus comprising a mixer housing, a precursor delivery chamber having an output in communication with the mixer housing, an oxidizing gas delivery chamber having an output in communication with the mixer housing, and a flashback member disposed within the mixer housing and between the output of the precursor delivery chamber and the output of the oxidizing gas delivery chamber, wherein the flashback member is located at a minimum distance from the output of the oxidizing gas delivery chamber defined by $L_{minimum}$ (cm)=0.453 U (Re)$^{-0.5567}$, wherein U is the flow rate in cm/sec of precursor and Re is the flow Reynolds number;
   delivering via the precursor delivery chamber a vaporized precursor in the mixer housing;
   delivering via the oxidizing gas delivery chamber an oxidizing gas to be mixed with the vaporized precursor such that the vaporized precursor and the oxidizing gas are mixed in the mixer housing; and
   outputting the mixed vaporized precursor and oxidizing gas as a stream to a burner to form silica soot.

2. The method of claim 1 further comprising depositing the silica soot onto a substrate to form an optical fiber preform.

3. The method of claim 1, wherein the flow Reynolds number is defined by $$Re = \frac{U\rho D}{\mu},$$

wherein ρ is density of the gas, D is distance between the flashback member and the oxidizing gas delivery chamber and μ is gas viscosity of the precursor.

4. The method of claim 1, wherein the minimum distance $L_{minimum}$ is at least 2 centimeters.

5. The method of claim 1, wherein the flashback member comprises a tapered surface on at least one side to reduce recirculation of gas.

6. The method of claim 5, wherein a ratio of a first distance between the precursor delivery chamber and the oxidizing gas delivery chamber to a second distance between the flashback member and the oxidizing gas delivery chamber is greater than 3.

7. The method of claim 1, wherein the precursor comprises a halide-free cyclo-siloxane.

* * * * *